United States Patent
Gasda et al.

(10) Patent No.: US 8,535,841 B1
(45) Date of Patent: Sep. 17, 2013

(54) METHODS OF REFURBISHING COMPONENTS OF A FUEL CELL STACK

(75) Inventors: Michael Gasda, Mountian View, CA (US); Matthias Gottmann, Sunnyvale, CA (US); Neil Ide, Sunnyvale, CA (US); Ryan Hallum, Mountain View, CA (US); Dien Nguyen, San Jose, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

(21) Appl. No.: 13/454,536

(22) Filed: Apr. 24, 2012

Related U.S. Application Data

(60) Provisional application No. 61/478,697, filed on Apr. 25, 2011.

(51) Int. Cl.
*H01M 8/04* (2006.01)

(52) U.S. Cl.
USPC .................................. 429/456; 429/458

(58) Field of Classification Search
None
See application file for complete search history.

(56) References Cited

U.S. PATENT DOCUMENTS

| | | | |
|---|---|---|---|
| 7,713,649 B2 | 5/2010 | Hickey et al. | |
| 2007/0082250 A1* | 4/2007 | Suzuki et al. | 429/35 |

* cited by examiner

*Primary Examiner* — Jonathan Crepeau
*Assistant Examiner* — Carmen Lyles-Irving
(74) *Attorney, Agent, or Firm* — The Marbury Law Group PLLC

(57) ABSTRACT

Methods for refurbishing components, such as interconnects of a fuel cell stack, include singulating the stack and removing the electrolyte, seals and oxide layer using non-mechanical methods. The various methods of may be used either singly or in combination.

13 Claims, 8 Drawing Sheets

METHODS OF REFURBISHING COMPONENTS OF A FUEL CELL STACK

CROSS-REFERENCE TO RELATED APPLICATION

This application claims the benefit of priority to U.S. Provisional Application No. 61/478,697, filed Apr. 25, 2011, the entire contents of which are incorporated herein by reference.

FIELD

The present invention is directed to fuel cell stacks, specifically to methods of refurbishing stack components, such as interconnects.

BACKGROUND

A typical solid oxide fuel cell (SOFC) stack includes multiple fuel cells separated by interconnects (IC) which provide both electrical connection between adjacent cells in the stack and channels for delivery and removal of fuel and oxidant. When hydrocarbons are used for fuel, some of the hydrocarbons may catalytically decompose or crack on the surface of the interconnect, leaving a deposit of coke. These coke deposits can clog the channels adversely affecting the performance of the fuel cell stack.

The fuel cell stack may be reconditioned, however, by refurbishing the interconnects. A typical IC refurbishment process may include the following steps: (1) singulation (separating ICs/individual fuel cells from one another), (2) removal of electrolyte debris from the IC, (3) removal of any other remaining internal stack components (if any) from the IC and (4) removal of high temperature adhesives, seals and protective coatings.

Prior singulation method includes mechanically prying the stack apart. This process is time-consuming and prone to damaging the interconnects, by chipping, cracking, or inducing camber (curvature).

After singulation, most of the electrolyte can be scraped off, but material left around the seal region is typically very well adhered to the IC and hard to remove. The last step to achieving a clean part is typically removing the metal oxide (e.g., chromium oxide) that grows on the fuel side of the chromium alloy IC and residual oxide seal material. A grit blasting process typically used in removing these oxides is costly, time consuming, difficult to control, and can cause damage to the part by inducing camber and excessive erosion of the part.

SUMMARY

Embodiments include methods for singulating a fuel cell stack that comprise connecting at least one conduit extending through multiple layers of a fuel cell stack to a fluid source, applying fluid in the conduit through at least one first layer of the fuel cell stack, blocking the conduit in a second layer of the fuel cell stack, and removing the second layer from the fuel cell stack.

Further embodiments include a method of singulating a fuel cell stack, comprising providing the fuel cell stack comprising a plurality of layers, and singulating the fuel cell stack using a non-mechanical method to remove at least one layer of the plurality of layers from the fuel cell stack.

Further embodiments include a method of removing fuel cell debris from a singulated fuel cell interconnect, comprising providing the interconnect singulated from a fuel cell stack, and non-mechanically removing at least part of the fuel cell debris from the interconnect.

Further embodiments include methods for singulating a fuel cell stack that comprise providing an induction heating coil proximate to a layer of a fuel cell stack, inductively heating the layer, and removing the layer from the fuel cell stack.

Further embodiments include methods for singulating a fuel cell stack that comprise introducing the fuel cell stack to a reducing gas containing environment at an elevated temperature, maintaining the fuel cell stack in the reducing gas containing environment at an elevated temperature for a period sufficient to weaken a bonding strength of a seal material, and removing at least one component from the fuel cell stack.

Further embodiments include methods for singulating a fuel cell stack that comprise introducing the fuel cell stack to a chemical solution configured to selectively remove a seal material from the stack, maintaining the fuel cell stack in the solution for a period sufficient to weaken a bonding strength of the seal material, removing at least one component from the fuel cell stack.

Further embodiments include methods for singulating a fuel cell stack that comprise directing radiation energy at a portion of the fuel cell stack to induce uneven heating in the stack, and removing at least one component from the fuel cell stack.

Further embodiments include methods for singulating a fuel cell stack that comprise directing acoustic energy at a portion of a stack, the acoustic energy having a frequency configured to damage a seal material without damaging at least one other component of the stack, and removing the at least one other component of the stack.

Further embodiments include methods of removing fuel cell debris from a fuel cell interconnect that comprise annealing the interconnect in a reducing-gas environment at a temperature from 850° C. to 1450° C., and removing the debris from the interconnect.

Further embodiments include methods of removing fuel cell debris from a fuel cell interconnect that comprise inductively heating the interconnect, and removing the fuel cell debris.

Further embodiments include methods of removing fuel cell debris from a fuel cell interconnect that comprise directing radiation energy at the interconnect to induce non-uniform heating, and removing the fuel cell debris.

Further embodiments include methods of removing fuel cell debris from a fuel cell interconnect that comprise heating the interconnect to a temperature from 850° C. to 1450° C., and removing the debris from the interconnect.

Further embodiments include methods of removing oxide debris from a fuel cell interconnect that comprise treating the interconnect with a chemical solution configured to selectively remove oxide materials.

Further embodiments include methods of removing oxide debris from a fuel cell interconnect that comprise electrochemically reducing an oxide material from a surface of the interconnect.

Further embodiments include methods of removing oxide debris from a fuel cell interconnect that comprise directing acoustic energy at the interconnect, the acoustic energy having a frequency configured to shatter oxide debris material on the interconnect without damaging the interconnect, and removing the oxide debris from the interconnect.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments include methods for refurbishing components, such as interconnects (ICs), of a fuel cell stack, such as a solid oxide fuel cell (SOFC) stack. Embodiments include methods of singulating, electrolyte removal, and seal, adhesive and coating removal. The various methods of singulating, electrolyte removal and seal, adhesive and coating removal may be used either singly or in combination or in combination with conventional techniques.

Figure 1A:
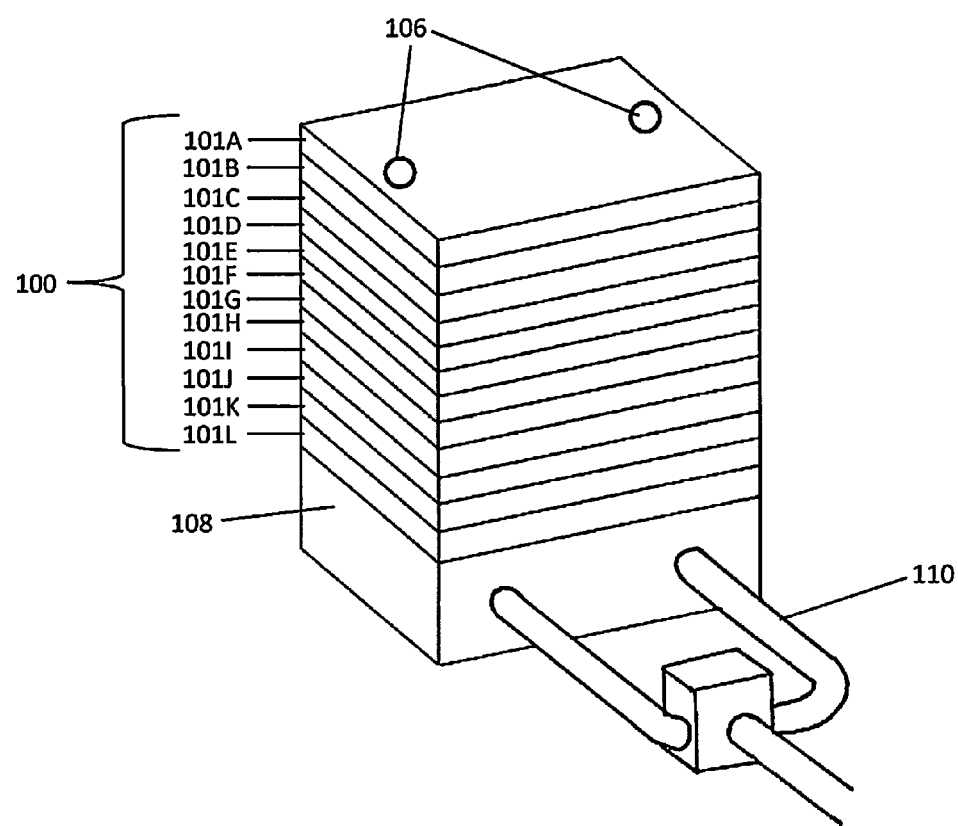
FIGS. 1A-1C schematically illustrate a method and apparatus for singulating components of a fuel cell stack using compressed fluid according to one embodiment.
Figure 1B:
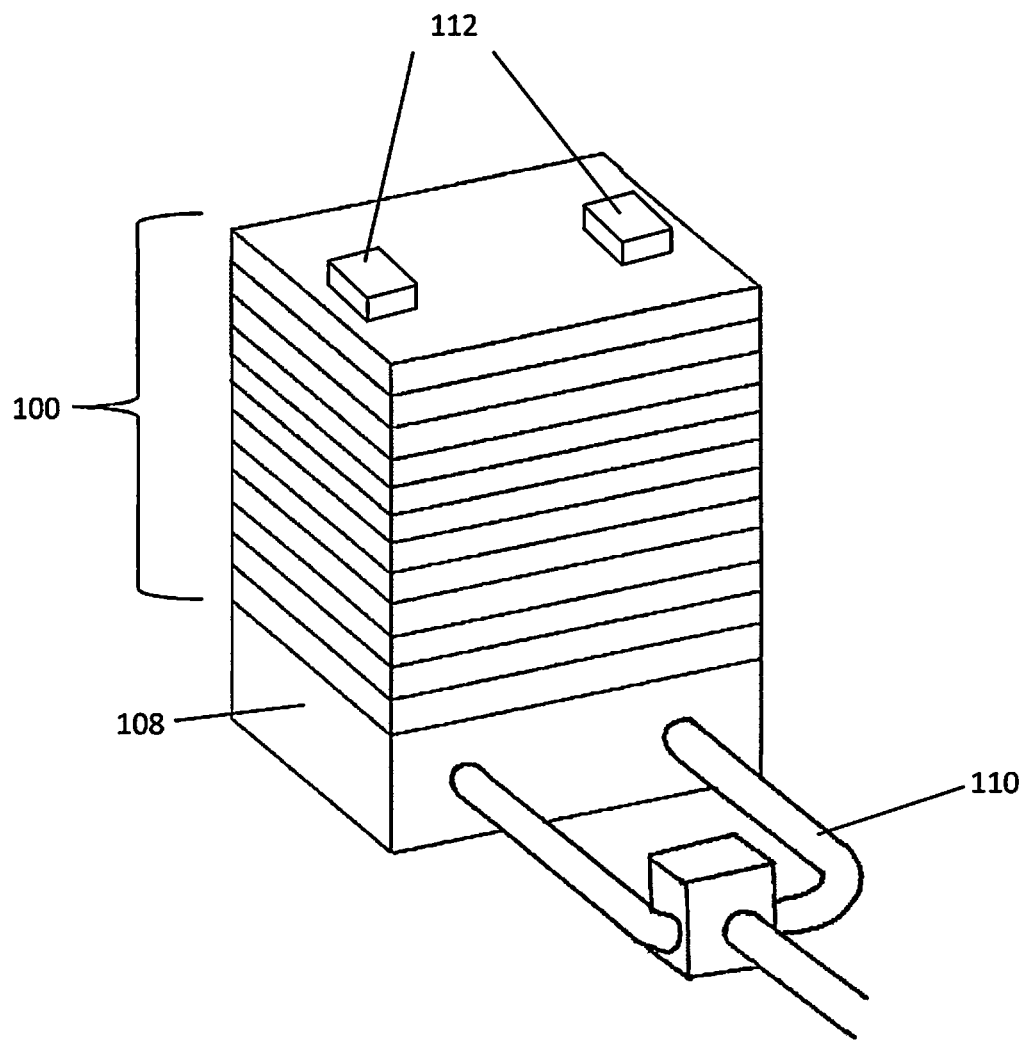
Figure 1C:
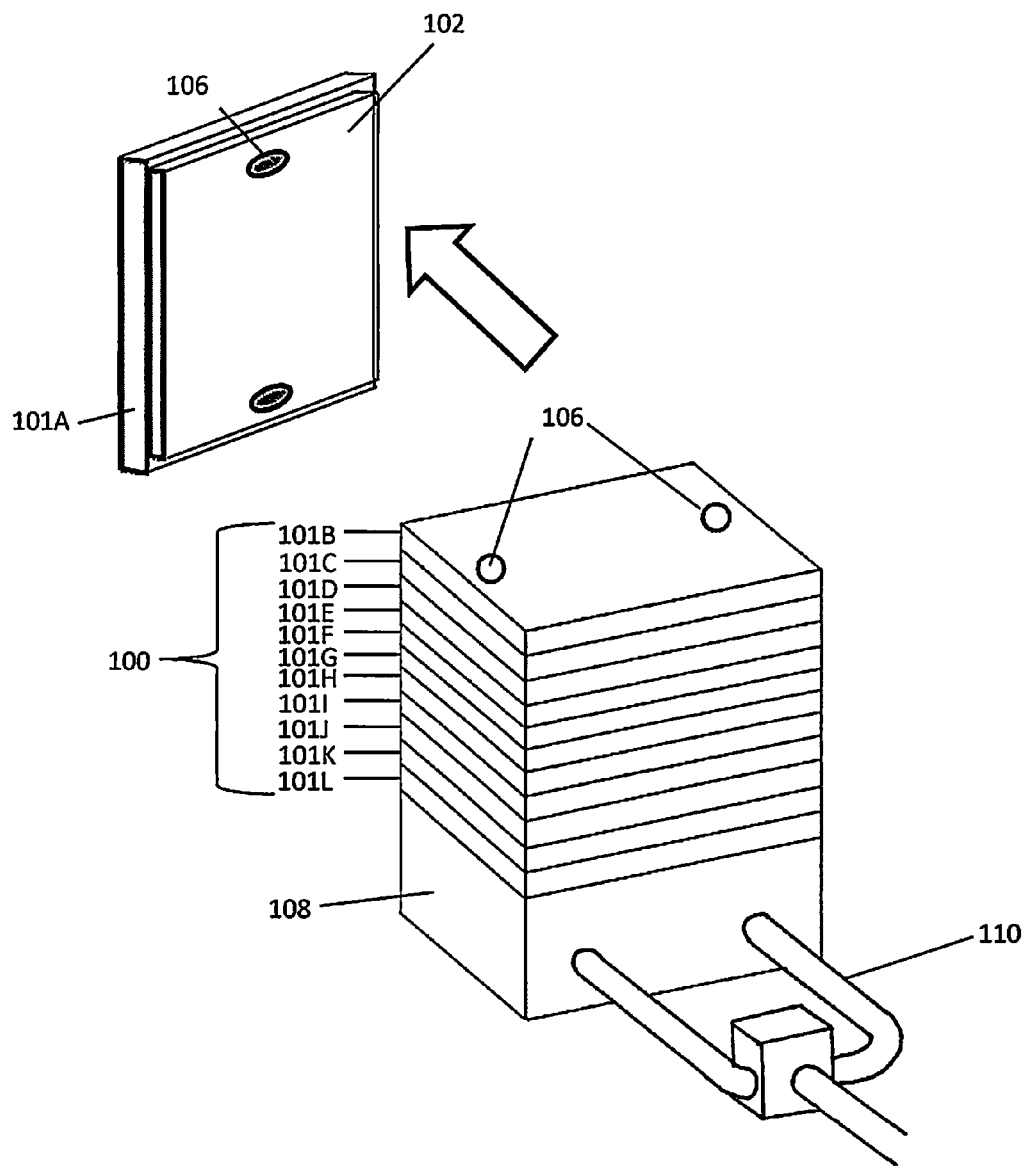

An example of a fuel cell stack 100 is illustrated in FIGS. 1A-1C. The fuel cell stack 100 comprises a plurality of layers 101A-101L, where each layer may comprise an interconnect. The layers 101A-101L may have a planar configuration, such as shown in FIGS. 1A-1C, or other geometries, such as a tubular configuration. A plurality of fuel cells 102 (see FIG. 1C) may be provided between each interconnect 101A-101L. In one embodiment, each of the fuel cells 102 may comprise a solid oxide fuel cell (SOFC), which may include a solid oxide electrolyte material having a cathode electrode on a first (e.g., air-side) surface and an anode electrode on a second (e.g., fuel-side) surface, as is known in the art. For example, the electrolyte may comprise a stabilized zirconia, such as yttria or scandia stabilized zirconia, and/or a doped ceria, such as samaria or scandia doped ceria, the anode electrode may comprise a nickel cermet, such as a nickel-stabilized zirconia and/or nickel-doped ceria cermet, and the cathode electrode may comprise a conductive perovskite material, such as lanthanum strontium manganate. Each of the interconnects 101A-101L may comprise an electrically conductive material, such as metal (e.g., a chromium-iron alloy, such as 4-6 weight percent iron, optionally 1 or less weight percent yttrium and balance chromium alloy), and may electrically connect the anode or fuel-side of one fuel cell to the cathode or air-side of an adjacent fuel cell. The interconnects 101 may also separate fuel, such as a hydrocarbon fuel, flowing to the anode-side of one cell in the stack 100 from oxidant, such as air, flowing to the cathode-side of an adjacent cell in the stack 100. Each interconnect 101 may be sealed or otherwise mechanically adhered to a surface of one or both of the adjacent fuel cells 102 in the assembled fuel cell stack 100.

The fuel cell stack 100 typically includes at least one internal fluid conduit, such as conduits 106 shown in FIGS. 1A-1C. The conduits 106 may extend through multiple layers of the stack 100, and preferably extend through the entire stack 100. The conduits 106 may be formed by holes or openings that are provided through the interconnects 101A-101L as well as through the fuel cells 102 provided between the interconnects. The openings may be aligned with each other such that when the stack is fully assembled, the openings form a continuous fluid conduit through multiple cells of the stack. A conduit 106 so formed (e.g., a riser channel) may be used to carry fuel through the stack 100 so that the fuel may be conveyed to the anode sides of each of the fuel cells 102 forming the stack. A second, or return conduit may be provided to remove spent fuel from each cell 102 and out of the stack 100. Such a stack 100 may be internally manifolded for fuel and externally manifolded for air. Thus, the stack may be open on at least two sides to allow oxidant (e.g., air) to flow across the cathode sides of each fuel cell. Alternatively, the stack may be internally manifolded for both air and fuel, in which case additional conduit(s) for bringing air to and from the cathode sides of each fuel cell may be provided.

Figure 2:
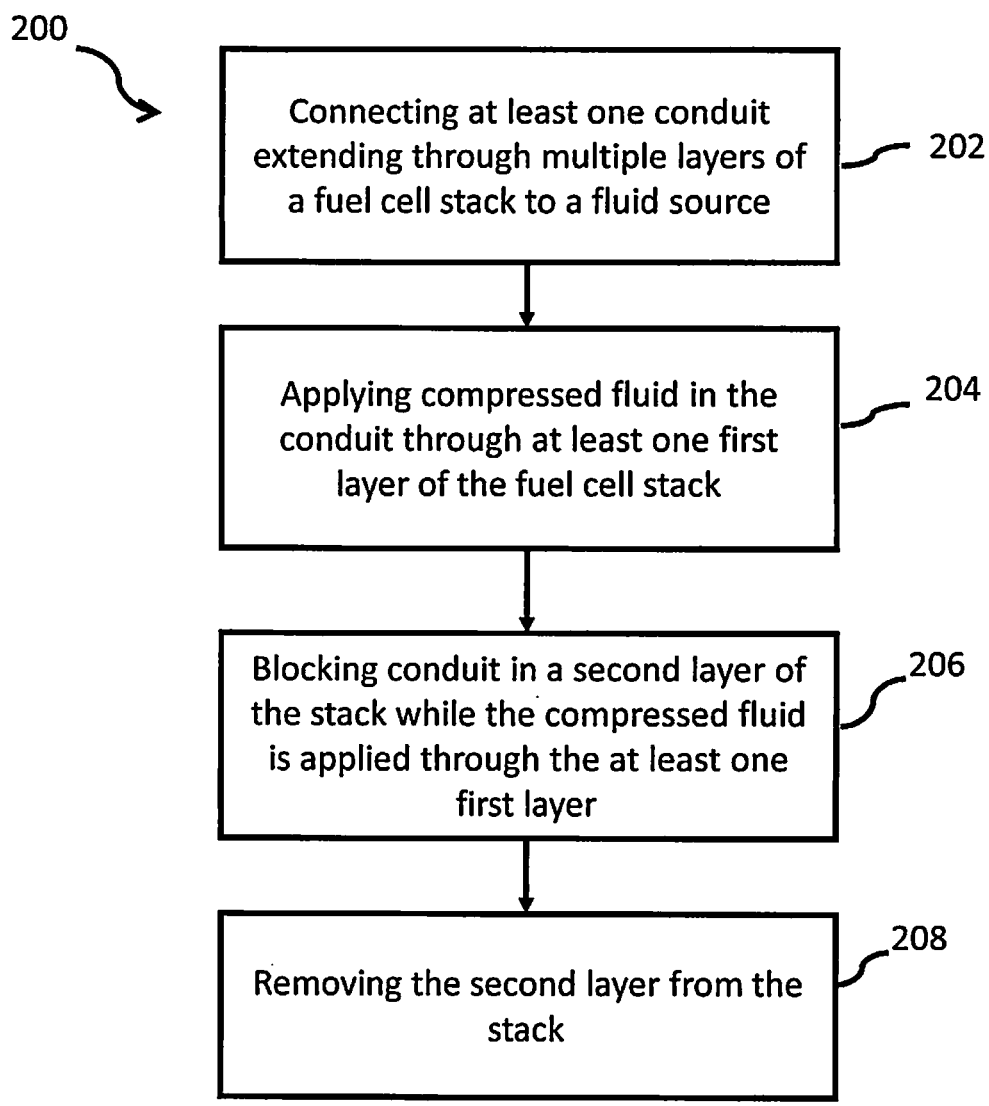
FIG. 2 is a process flow diagram illustrating a method for singulating a component of a fuel cell stack using compressed fluid.

FIG. 2 is a process flow diagram illustrating a method 200 for singulating a component of a fuel cell stack using compressed fluid (e.g., pneumatic singulation) according to one embodiment. The method 200 includes connecting at least one conduit 106 extending through multiple layers of a fuel cell stack 100 to a fluid source at step 202. The multiple layers of the fuel cell stack through which the conduit 106 extends may be, for example, a plurality of interconnects 101A-101L and intervening fuel cells 102. In embodiments, the conduit 106 may extend through multiple adjacent interconnects 101 and fuel cells 102 in the stack 100, and in some cases, may extend through the entire stack 100. The conduit may be an internal opening or conduit, such as fuel riser openings through a stack that is internally manifolded for fuel, as shown in FIGS. 1A-1C. The stack 100 may be placed onto a manifold fixture 108 connected to a tube or pipe 110 that may plumb a fluid (e.g., air) to the inlet and outlet fuel holes on the bottom of the stack 100.

In step 204 of method 200, compressed fluid is applied in the conduit 106 through at least one first layer of the fuel cell stack 100. In embodiments, the compressed fluid is compressed air, which may be at a pressure greater than 20 psig, such as 25 to 125 psig, for example 95-110 psig. In step 206, the conduit 106 in a second (e.g., top) layer of the stack 100 is blocked while the compressed fluid is applied through the at least one first layer. The pneumatic force applied to the second (e.g., top) layer may thus mechanically separate the second layer from the at least one first layer of the stack 100 (e.g., the rest of the stack). The second layer may then be removed from the stack in step 208.

In embodiments, the pneumatic separating action may be achieved by applying air pressure through one layer's fuel ports instantaneously with the adjacent layer's fuel port blocked. Low tooling costs and high yield make this a preferred method for mechanical separation. As shown in FIGS. 1A-1C, for example, compressed air at high pressure (e.g., 90 psig or more) may be provided into the fuel inlet and outlet holes in the manifold 108 or directly in the bottom of the stack such that air flows into the stack at high velocity. When, in one embodiment, the air flow through the fuel ports 106 out of the stack is interrupted by quickly blocking the airflow at the fuel ports in the top layer of the stack (outlet ports or top of riser openings), as is shown in FIG. 1B, pressure builds in the fuel cell stack. When the pressure exceeds the adhesive strength of the seal material, the top layer of the stack 100, which may include an interconnect 101 and/or fuel cell 102, pops off or is otherwise physically separated from the stack 100 and may be removed. FIG. 1C, for example, illustrates the top layer of the stack 100, specifically interconnect 101A, removed from the stack 100. All or a portion of an adjacent fuel cell 102, which may be a SOFC including the ceramic electrolyte, may be adhered to the surface of the interconnect 101A. Alternatively, air may be directed into the fuel port outlet and the bottom layer (e.g., interconnect and/or fuel cell) may be removed.

In this embodiment, a continuous air-flow through the fuel risers may be interrupted manually or by using a tool. The operator may use two fingers (e.g., thumbs) or a simple, specially-designed tool with two plugs (shown schematically in FIG. 1B) to cover the riser openings 106 in the top of the stack to pop off layers of the stack individually. In this way for example, a 25-cell stack can be reliably disassembled in less than a minute, which is faster than the mechanical prying method, and less prone to damaging the interconnects.

Method 200 also encompasses alternative embodiments in which the flow of compressed fluid is nominally off, and a burst of compressed fluid (e.g., air) is provided through the conduit in a first layer while the openings 106 in the second layer are blocked (i.e., the conduit in the second layer may be blocked in step 206 before the compressed air is provided in the conduit through the first layer in step 204). In this embodiment, the stack may also be placed onto the manifold fixture shown in FIGS. 1A and 1B that plumbs air to the inlet and outlet fuel ports or risers on the bottom of the stack. The upper fuel inlet and exhaust ports or risers are then blocked and the stack may be pressurized using a pneumatic valve which opens briefly (e.g., for less than 1 second, such as 0.1 to 0.5 seconds) to generate a sufficient air pressure in the fuel risers to pop off the top layer from the stack 100.

In various embodiments, fluids other than air may be utilized for the pneumatic singulation. For example, a less compressible fluid than air, such as liquid water, may be provided from the manifold into the risers to separate the stack layers. The less compressible fluid stores less energy than air while pressure is building and provides the same forces and pressure as air without the large release of energy.

Figure 3:
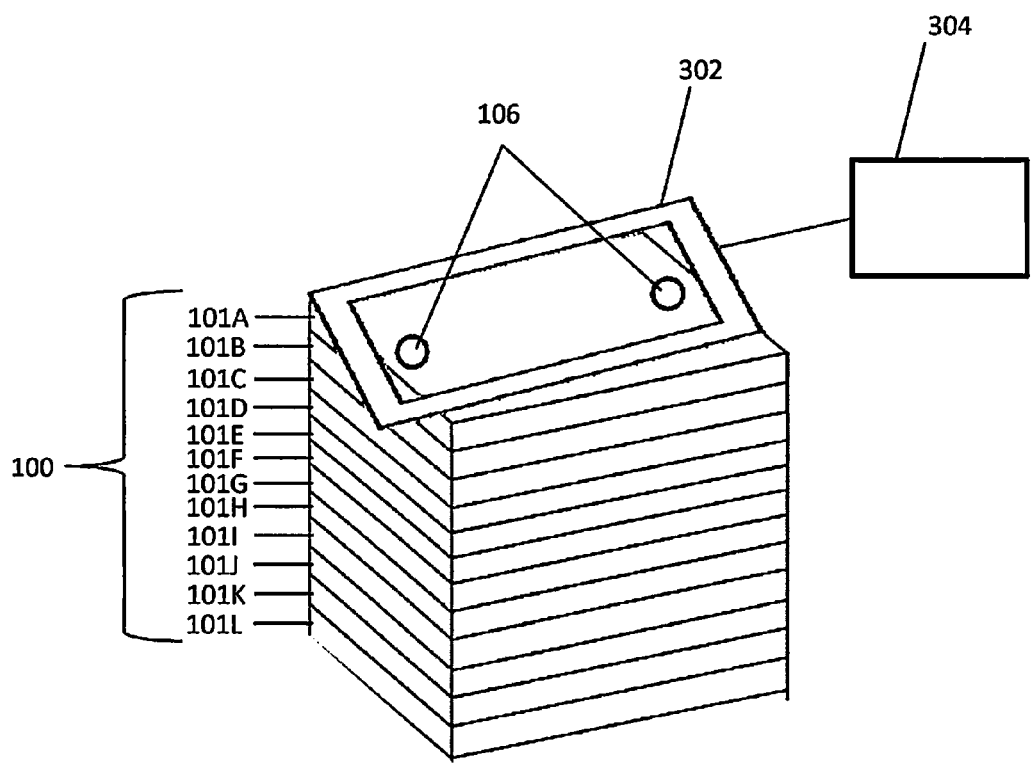
FIG. 3 schematically illustrates a method for singulating a fuel cell stack using inductive heating.

FIG. 3 schematically illustrates a further embodiment method for singulating a fuel cell stack using inductive heating. According to this embodiment, induction heating may introduce rapid local heating and thus induce thermal shock within one or more components of a fuel cell stack 100. Induction heating is a process in which heat can be rapidly and controllably applied to a metal part. It is based on the principle that a changing electric current passing through a coil causes a changing magnetic field in the area around the coil. If a metal part is placed in the vicinity of this changing magnetic field, a changing electric current is induced in the part, giving rise to rapid heating. As shown in FIG. 3, an induction heating coil 302, which may be coupled to a power supply 304, is placed near a fuel cell stack 100. The fuel cell stack 100 may be similar to the stack 100 described above in connection with FIGS. 1A-1C. The induction heating coil 302 may induce a rapid temperature rise in a part of the fuel cell proximate to the coil 302. This rapid temperature rise may thermally shock the part, causing uneven thermal expansion and cracking a seal (e.g., a glass or glass ceramic oxide seal, such as a silicon oxide based seal) securing the part, such as interconnect 101A, to the rest of the fuel cell stack 100. In this way, the part, such as an interconnect 101A, can be reliably singulated. Metal components such as a conventional interconnect have high induction susceptibility and may thus rise in temperature much more rapidly than neighboring components, such as the seal (e.g., oxide seal) and ceramic fuel cell components. Due to the mismatch in the coefficient of thermal expansion, cracking occurs between the oxide high temperature adhesive and the metal interconnect, thus separating them elegantly without damaging the interconnect.

Figure 4:
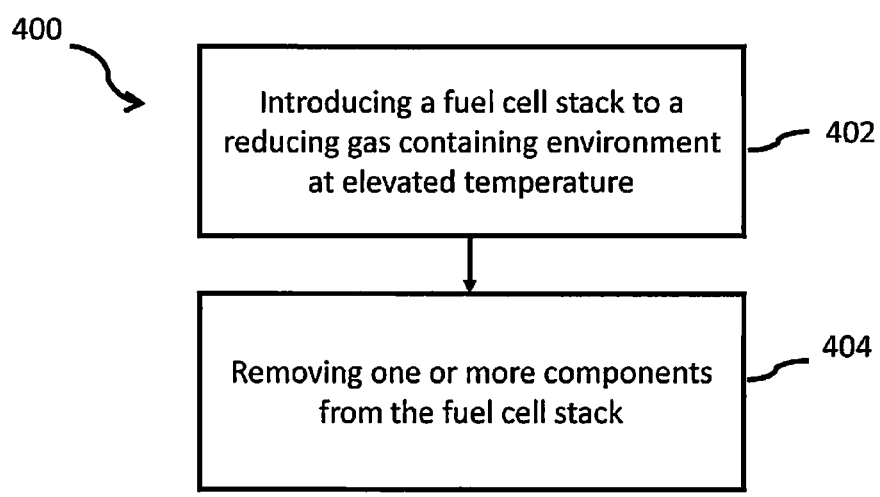
FIG. 4 is a process flow diagram illustrating an embodiment method for singulating a fuel cell stack by annealing the stack in a reducing gas environment.

FIG. 4 is a process flow diagram illustrating an embodiment method 400 for singulating a fuel cell stack by annealing in an environment containing a reducing gas (e.g., hydrogen). This method 400 may be used to separate multiple layers of a stack 100 at the same time. The method 400 includes introducing a fuel cell stack 100 to a reducing gas (e.g., hydrogen) containing environment at elevated temperature in step 402. Under a high temperature environment, hydrogen gas molecules may penetrate, attack and weaken the seal material, such as an oxide adhesive seal material, thereby taking away its bonding function. For example, the stack may be placed in a furnace in a dry (or moist) atmosphere comprising hydrogen (or other reducing gases, such as carbon monoxide, forming gas, or mixtures of reducing gases) and heated to high temperature (e.g., in the range 850° C. to 1450° C., such as 900-1100° C., such as 950-1050° C., such as 950° C.). Preferably, the hydrogen is provided both inside and outside of the stack 100. That is, the stack 100 may be immersed in the hydrogen atmosphere. This hydrogen annealing step may reduce an oxide within and/or on the surface of the cell components, such as a chromium oxide on a surface of a Cr—Fe alloy interconnect. These oxides help gas permeation through these components and help maintain the dimensional stability of the components. After the hydrogen annealing step at elevated temperature, one or more components may be removed from the stack at step 404.

In an alternative embodiment of a singulation method, the fuel cell stack 100 may be subjected to an environment containing one or more specific acids or bases for selective removal of a sealant material. In one embodiment, the stack 100 may be placed in a chemical stripping bath designed to specifically attack (i.e., selectively etch) a seal material (e.g., an oxide seal material), but not the metal material (e.g., Cr or Cr—Fe alloy) of the interconnects. Hydrofluoric acid (HF) may be used as the selective oxide etching material. I-1F strongly attacks oxides, such as silica and other oxides used for typical SOFC seals, and only slowly attacks the Cr—Fe—Y or Cr—Fe base metal alloy of the IC component. Other chemicals, such as nitric acid, hydrochloric acid, sulfuric acid, phosphoric acid, sodium hydroxide, potassium hydroxide, lithium hydroxide, and molten salts such as chlorides (NaCl, KCl, $MgCl_2$, $CaCl_2$), fluorides, iodides, bromides, and/or other organic or inorganic salts, ceric ammonium nitrate, perchloric acid, and/or potassium hexacyanoferrate, could also be utilized.

Figure 5:
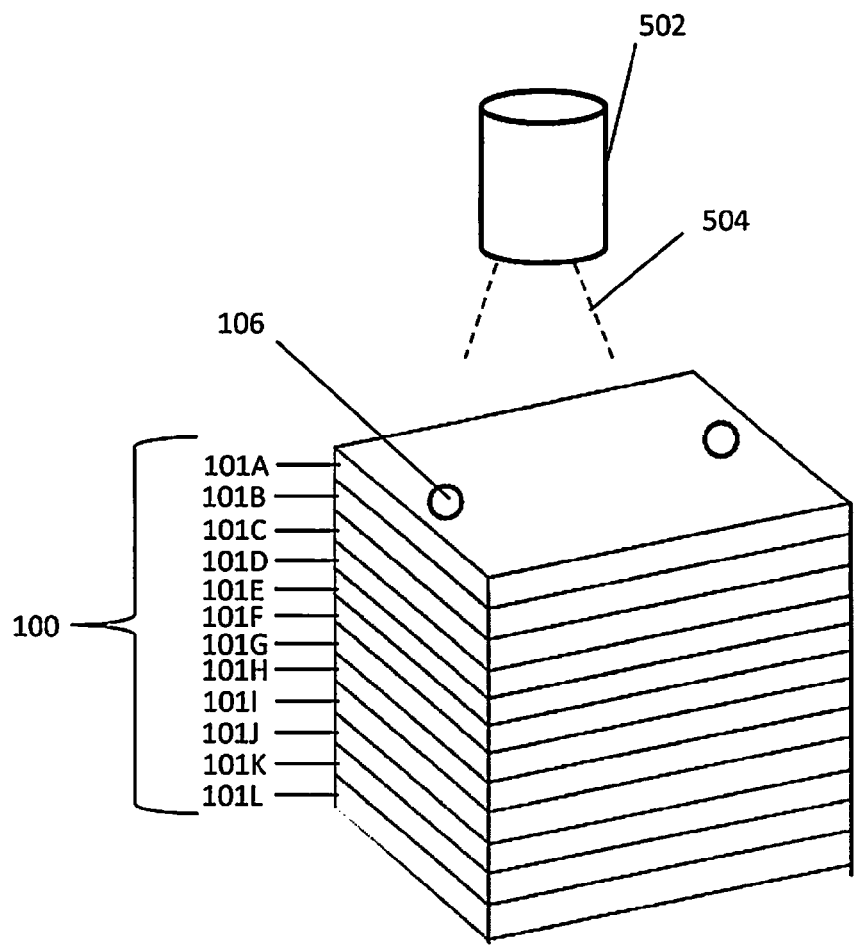
FIG. 5 schematically illustrates a method for singulating a fuel cell stack using radiation energy.

FIG. 5 schematically illustrates yet another method for singulating a component of a fuel cell stack by directing radiation energy at a portion of the stack. In embodiments, the radiation energy may induce uneven heating in the stack, such that one portion of the stack is heated to a higher temperature (e.g., at least 100° C. more) than another portion of the stack. For example, the top of the stack may be heated to a higher temperature than the bottom of the stack, or vice-versa. As shown in FIG. 5, at least one radiation energy source 502 may direct a beam 504 of radiation energy to a portion of the stack 100, such as the top of the stack. The radiation energy induces non-uniform heating in a portion of the stack, causing the seals to break and the interconnects 101 to separate (i.e., the stack to fall apart). The radiation energy may induce thermal shock in the targeted portion of the stack 100. The targeted portion of the stack may be heated in a temperature range of 850° C. to 1450° C., such as 900-1100° C., such as 950-1050° C. In embodiments, the at least one radiation energy source 502 may comprise an infrared radiation source (e.g., IR lamp) that directs a beam of infrared energy at a portion of the stack. In various embodiments, the at least one radiation energy source 502 may be a source of microwave energy that directs a beam of microwave energy at a portion of the stack. In still further embodiments, the at least one radiation energy source 502 may be a laser source that directs a beam of laser energy at the stack.

In further embodiments, a method for singulating a component of a fuel cell stack includes directing acoustic energy at a portion of the stack. An acoustic energy source (e.g., a sonic source, such as an ultrasonic transducer) may be used to direct acoustic energy at the stack. A high frequency sound may be used to shatter the seals. A single frequency or set of frequencies or spectrum of frequencies may be selected such that the seals are reliably destroyed but the interconnects are not damaged.

Typically, the interconnects may be cleaned after singulation. Much of the material clinging to the interconnects may be brushed off. However, as discussed above, ceramic electrolyte material (e.g., stabilized zirconia, such as yttria or scandia stabilized zirconia, and/or doped ceria, such as samaria or scandia doped ceria) adjacent to the seal material is typically well adhered to the interconnect. Furthermore, optional intermediate electrical contact layers or parts of multi-component interconnects (if present) may also need to be removed from the interconnects. Various embodiments include methods to remove this material that do not warp or otherwise damage the interconnect.

A first embodiment method includes introducing a part (e.g., an interconnect) to a reducing gas (e.g., hydrogen) containing environment at elevated temperature. This method may be similar to method 400 described above in connection with FIG. 4. For example, the one or more interconnects may be placed in a furnace in a thy (or moist) atmosphere comprising hydrogen (or other reducing gases, such as carbon monoxide, forming gas, or mixtures of reducing gases) and heated to high temperature (e.g., in the range 850° C. to 1450° C., such as 900-1100° C., such as 950-1050° C., such as 950° C.). This method may be performed after the interconnect(s) have been singulated from the stack, or simultaneous with the singulation process. Subjecting the interconnect(s) to a high-temperature, reducing gas environment causes the electrolyte and other debris material to soften, and thus be more easily removed mechanically and/or by etching.

A further embodiment method for removal or electrolyte material and other debris from a part (e.g., an interconnect) includes inductively heating the part before removing the electrolyte material and/or other debris. This method may be similar to the inductive heating singulation method described above and illustrated in FIG. 3. This method may be performed after the interconnect(s) have been singulated from the stack, or simultaneous with the singulation process. Inductively heating the interconnect may thermally shock the interconnect which may facilitate removal of electrolyte material and/or other debris mechanically and/or by etching.

A further embodiment method for removal of electrolyte material and other debris from a part (e.g., an interconnect) includes directing radiation energy at the part to heat the part. This method may be similar to the singulation method using radiation energy described above and illustrated in FIG. 5. This method may be performed after the interconnect(s) have been singulated from the stack, or simultaneous with the singulation process. Heating the interconnect with radiation energy, such as IR, microwave, and/or laser energy, may thermally shock the interconnect which may facilitate removal of electrolyte material and/or other debris mechanically and/or by etching.

Various embodiments may also utilize a slow heating process. The part may be heated with a furnace, IR, microwave, or laser radiation, (e.g., in the range 850° C. to 1450° C., such as 900-1100° C., such as 950-1050° C., such as 950° C.), but more slowly than the heating rate necessary for thermal shock. A scraping tool may then used to scrape off oxide seal and electrolyte debris while the oxide seal is melted.

A last step to achieving a clean interconnect may be removing the oxide (e.g., Cr oxide) that grows on the fuel side of the IC and any residual oxide seal material or electrolyte material on the interconnect. This has previously been done using grit blasting. However the grit blasting process is costly, time consuming, difficult to control, and can cause damage to the part by inducing camber and excessive erosion of the part.

Various embodiments include methods for removing the various high-temperature seals, adhesive, protective coating layer and other residual material (e.g., oxide material) from a part (e.g., an interconnect) that does not require grit blasting the part.

In a first embodiment method, a part from a fuel cell stack (e.g., an interconnect) may be chemically treated to remove residual materials, such as seal material and/or a protective oxide layer. Oxides covering an interconnect, for example, may be removed by dipping the interconnect in a solution containing specific acids or bases for selective removal (i.e., etching) of various oxides and coating materials. The chemical stripping bath is designed only to attack oxide material, such as a silicon oxide based glass seal material, residual electrolyte, Cr oxide, but not Cr metal or the Cr—Fe alloy of the interconnect.

For example, hydrofluoric acid (HF) may be used to selectively etch the ceramic electrolyte by weakening the electrolyte by a grain boundary attack process. HF strongly attacks oxides, such as those used for typical SOFC electrolytes (e.g., stabilized zirconia or doped ceria), seals, and only slowly attacks the Cr—Fe—Y or Cr—Fe base metal alloy of the interconnect component. Other acids, such as nitric acid, hydrochloric acid, sulfuric acid, phosphoric acid or their mixtures could also be used as cleaning agents for the stack oxides. Basic solutions such as sodium hydroxide, potassium hydroxide, lithium hydroxide, and molten salts such as chlorides (NaCl, KCl, $MgCl_2$, $CaCl_2$), fluorides, iodides, bromides, and/or other organic or inorganic salts may also be effective cleaning agents as well.

Ceric ammonium nitrate, perchloric acid, and/or potassium hexacyanoferrate may be used to etch the Cr oxide that forms on the chromium alloy interconnect surfaces. However, these etches should be timed to prevent also etching the Cr alloy interconnect. The seal and electrolyte etch (e.g., HF etch) may be conducted before or after the chromium oxide (chromia) etch.

Figure 6:
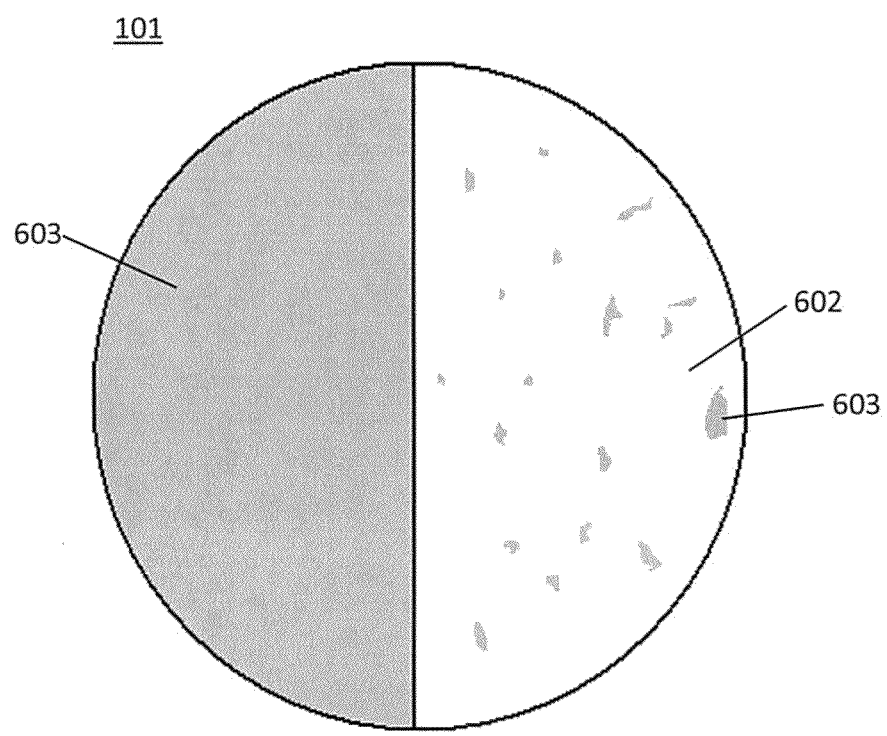
FIG. 6 is a front view of an interconnect illustrating the effect of a hydrofluoric acid (HF) treatment on removal of a fuel cell electrolyte from the interconnect.

FIG. 6 illustrates the effect of a HF treatment on a fuel cell electrolyte debris 602 which adheres to the interconnect 101. As can be seen in FIG. 6, a 3 hour soak in a 20% HF solution turns the electrolyte debris 602 into a white powder which can then be removed mechanically and/or by etching. Chromium oxide 603 which covers the interconnect, in contrast, is not affected by the HF solution. Thus, treatment with HF is an effective method for removing electrolyte 602 from an interconnect 101.

An electrochemical method may also be used to remove debris, such as oxide debris, from a part (e.g., an interconnect). In one embodiment, a Cr oxide covered interconnect is placed in a molten salt bath as described above. An electrode (such as a graphite electrode) is also placed in the bath with the interconnect. An electric current is applied between the interconnect (which functions as an electrode) and the other electrode (e.g., the graphite electrode) in the bath. The Cr oxide may thereby be reduced, removing it from the interconnect. Molten salts can be used above their melting temperature, and preferably up to 1000° C. Alternatively, molten hydroxides can be used in this process.

The aforementioned methods may be combined with mechanical methods (e.g., scraping) to enhance their effectiveness of cleaning and removing oxides from stack components.

In further embodiments, an acoustic shock from a sonic power source may be used to shatter oxide seals which are adhered to a part (e.g., an interconnect). High frequency acoustic energy may be directed at the interconnect to shatter the seal material adhered to the interconnect. A single frequency or set of frequencies or spectrum of frequencies may be selected such that the seals are reliably destroyed but the interconnects are not damaged.

In still further embodiments, the part, such as an interconnect, may be heated, such as via induction, IR, laser, microwave heating, etc., as described above. The heating may induce thermal shock in the part, which may enable residual materials to be easily cleaned from the part.

Benefits of the various embodiment methods for refurbishing a component of a fuel cell stack described herein may include one or more of the following:
1. Lower cost per part,
2. Higher yield (i.e., less damage to the interconnects),
3. Increased scalability,
4. Increased reliability,
5. Less change to critical dimensions of the interconnect, such as flow channel geometry,
6. Easier to automate.

While components, such as interconnects and electrolytes, of a solid oxide fuel cell stack were described above in various embodiments, embodiments can include any other fuel cell components or interconnects, such as molten carbonate or PEM fuel cell components or interconnects, or any other metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of singulating a fuel cell stack comprising a first end, a second end and a stacking dimension between the first end and the second end, a plurality of interconnects and a plurality of solid oxide fuel cells, each fuel cell positioned between adjacent interconnects along the stacking dimension of the fuel cell stack, and an internal conduit extending from the first end to the second end, through the plurality of interconnects and fuel cells, for conveying a fuel to or spent fuel from the plurality of fuel cells, the method comprising:
   connecting a fluid source to the internal conduit at the first end of the stack;
   applying fluid in the conduit through the plurality of interconnects and fuel cells; and
   blocking the conduit in a first interconnect at the second end of the stack while leaving the conduit unblocked in at least one second interconnect in the stack such that a fluid pressure within the stack exceeds an adhesive strength of a sealing material in the stack, causing the first interconnect at the second end of the stack to completely separate from the fuel cell stack.

2. The method of claim 1, wherein the fluid comprises a compressed fluid.

3. The method of claim 2, wherein the fluid comprises air or water.

4. The method of claim 3, wherein the fluid comprises the air having a pressure greater than 20 psig.

5. The method of claim 4, wherein the air has a pressure between 90 and 125 psig.

6. The method of claim 1, wherein the fluid is continuously applied through the conduit or the fluid is applied in one or more bursts.

7. The method of claim 1, further comprising removing debris from the interconnect separated from the stack, wherein the debris comprises at least one of electrolyte material, seal material and chromium oxide material.

8. The method of claim 7, wherein removing the debris comprises non-mechanically removing at least part of the debris from the interconnect.

9. The method of claim 8, wherein the step of non-mechanically removing at least part of the debris comprises removing the debris by at least one of inductive heating, radiative heating, thermally heating in a reducing gas containing environment, chemical wet etching, or acoustic energy.

10. The method of claim 9, wherein a first part of the fuel cell debris is non-mechanically removed from the interconnect.

11. The method of claim 10, further comprising removing a second part of the debris by mechanical scraping.

12. The method of claim 11, wherein substantially all of the debris is removed from the interconnect without grit blasting the interconnect.

13. The method of claim 1, wherein the plurality of interconnects comprise chromium-iron alloy interconnects.

* * * * *